United States Patent
Beauchesne-Martel

(10) Patent No.: US 11,047,314 B2
(45) Date of Patent: Jun. 29, 2021

(54) SYSTEMS AND METHODS FOR CONTROL OF ENGINE VARIABLE GEOMETRY MECHANISM

(71) Applicant: PRATT & WHITNEY CANADA CORP., Longueuil (CA)

(72) Inventor: Philippe Beauchesne-Martel, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 290 days.

(21) Appl. No.: 16/299,220

(22) Filed: Mar. 12, 2019

(65) Prior Publication Data

US 2020/0291870 A1    Sep. 17, 2020

(51) Int. Cl.
  *G06F 19/00*  (2018.01)
  *F02C 9/20*   (2006.01)
  *B64C 30/00*  (2006.01)

(52) U.S. Cl.
  CPC ............... *F02C 9/20* (2013.01); *B64C 30/00* (2013.01); *F05D 2260/81* (2013.01); *F05D 2270/023* (2013.01); *F05D 2270/053* (2013.01)

(58) Field of Classification Search
  None
  See application file for complete search history.

(56) References Cited

U.S. PATENT DOCUMENTS

| | | | |
|---|---|---|---|
| 5,102,298 A | 4/1992 | Kreitmeier | |
| 9,303,565 B2 | 4/2016 | Fichtner et al. | |
| 9,512,764 B2 | 12/2016 | Morgan et al. | |
| 2008/0076623 A1* | 3/2008 | Tabata | B60L 15/2054 477/5 |
| 2008/0114522 A1* | 5/2008 | Matsubara | B60W 30/186 701/99 |

* cited by examiner

*Primary Examiner* — Adam M Alharbi
(74) *Attorney, Agent, or Firm* — Norton Rose Fulbright Canada LLP

(57) ABSTRACT

Methods and systems for controlling an engine having a variable geometry mechanism are described. An output power of the engine is determined. A speed of the engine is determined. A temperature-independent position control signal for the variable geometry mechanism is generated based on a power-to-speed ratio, the power-to-speed ratio obtained by dividing the output power by the speed. The position control signal is output to a controller of the engine to control the variable geometry mechanism.

20 Claims, 4 Drawing Sheets

SYSTEMS AND METHODS FOR CONTROL OF ENGINE VARIABLE GEOMETRY MECHANISM

TECHNICAL FIELD

The application relates generally to engines, and more particularly to control of variable geometry mechanisms (VGMs) in engines.

BACKGROUND OF THE ART

During aircraft operations consisting of rapid engine transitions from low to high power levels, it is desirable to reduce the response time of the engine in order to achieve a required power. For this purpose, inlet mass flow can be increased by accelerating the gas generator of the engine, thereby increasing the engine's power. This may be achieved by a variety of techniques which adjust the shape or geometry of one or more components of the engine, called variable geometry mechanisms, thereby adjusting the response of the engine.

Variable geometry mechanisms are controlled as a function of the operating temperature of the engine. However, traditional temperature sensors are slow to react to changes in temperature. There is therefore a need for improved control schemes for variable geometry mechanisms.

SUMMARY

In accordance with a broad aspect, there is provided a method for controlling an engine having a variable geometry mechanism. An output power of the engine is determined. A speed of the engine is determined. A temperature-independent position control signal for the variable geometry mechanism is generated based on a power-to-speed ratio, the power-to-speed ratio obtained by dividing the output power by the speed. The position control signal is output to a controller of the engine to control the variable geometry mechanism.

In accordance with another broad aspect, there is provided an engine control system for an engine having a variable geometry mechanism. The engine control system comprises a processing unit and a non-transitory computer-readable memory communicatively coupled to the processing unit. The computer-readable memory comprises computer-readable instructions which are executable by the processing unit for: determining an output power of the engine; determining a speed of the engine; generating a temperature-independent position control signal for the variable geometry mechanism based on a power-to-speed ratio, the power-to-speed ratio obtained by dividing the output power by the speed; and outputting the position control signal to a controller of the engine to control the variable geometry mechanism.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
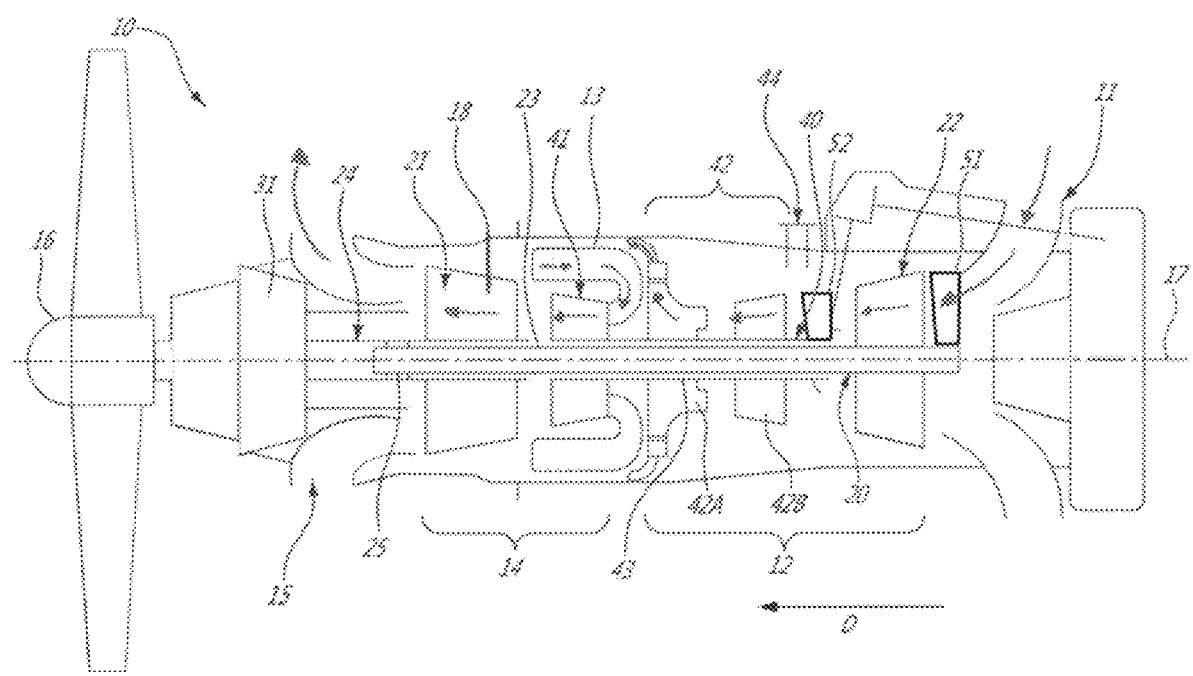
FIG. 1 is a schematic cross-sectional view of a gas turbine engine, in accordance with some embodiments.

FIG. 1 illustrates an engine 10, for example of a type provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 includes a propeller 16 which provides thrust for flight and taxiing. The engine 10 has a longitudinal center axis 17. The engine 10 may be a gas turbine engine, as illustrated in FIG. 1, or any other suitable type of engine.

The engine 10 has a central core 18 defining a gas path through which gases flow as depicted by flow arrows in FIG. 1. The exemplified engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

Although illustrated as a turboprop engine, the engine 10 may alternatively be another type of engine, for example a turbofan engine, also generally comprising in serial flow communication a compressor section, a combustor, and a turbine section, and a fan through which ambient air is propelled. A turboshaft engine may also apply. Similarly, although illustrated as a reverse-flow engine, the techniques described herein can also be applied to through-flow engines. In addition, although the engine 10 is described herein for flight applications, it should be understood that other uses, such as industrial or the like, may apply.

Still referring to FIG. 1, the engine 10 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about axis 17. However, it is understood that a multi-spool engine could have more than two spools. It should also be noted that the embodiments described herein also consider the use of single-spool engines.

The LP spool 20 includes at least one component to compress the air that is part of the compressor section 12, and at least one component to extract energy from the combustion gases that is part of the turbine section 14. More particularly, the LP spool 20 has a low pressure turbine 21 which extracts energy from the combustion gases, and which is drivingly engaged to an LP compressor 22 for pressurizing the air. The LP turbine 21 (also referred to as the power turbine) drives the LP compressor 22, thereby causing the LP compressor 22 to pressurize the air. Both the LP turbine 21 and the LP compressor 22 are disposed along the axis 17. In the depicted embodiment, both the LP turbine 21 and the LP compressor 22 are axial rotatable components having an axis of rotation that is coaxial with the center axis 17. They can include one or more stages, depending upon the desired engine thermodynamic cycle, for example.

In the depicted embodiment, the LP spool 20 has a power shaft 23 which mechanically couples the LP turbine 21 and the LP compressor 22, and extends axially between them. The shaft 23 is coaxial with the central axis 17 of the engine 10. The shaft 23 allows the LP turbine 21 to drive the LP compressor 22 during operation of the engine 10. The shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the shaft 23 can be combined with a geared LP compressor 22 to allow the LP compressor 22 to run at a different rotational speed from the LP turbine 21. This can provide more flexibility in the selection of design points for the LP compressor.

Still referring to FIG. 1, the engine 10 includes an output drive shaft 24. The drive shaft 24 extends forwardly from the LP turbine 21 and is drivingly engaged thereto. In the illustrated example, the drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23, 24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23, 24. For example, the power and drive shafts 23, 24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine 21. The drive shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through known gear reduction techniques. The RGB 31 allows for the propeller 16 to be driven at its optimal rotational speed, which is different from the rotational speed of the LP turbine 21.

Still referring to FIG. 1, the HP spool 40 is composed of at least one component to compress the air that is part of the compressor section 12, and at least one component to extract energy from the combustion gases that is part of the turbine section 14. The HP spool 40 is also disposed along the axis 17 and includes an HP turbine 41 drivingly engaged (e.g. directly connected) to a high pressure compressor 42 by an HP shaft 43 rotating independently of the power shaft 23. Similarly to the LP turbine 21 and the LP compressor 22, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22. The engine 10 shown in FIG. 1 is thus a "two-spool" engine 10.

The HP turbine 41 and the HP compressor 42 can have any suitable mechanical arrangement to achieve the above-described split compressor functionality. For example, and as shown in FIG. 1, the HP spool 40 includes a high pressure shaft 43 extending between the HP compressor 42 and the HP turbine section 41. The high pressure shaft 43 is coaxial with the power shaft 23 and rotatable relative thereto. The relative rotation between the high pressure shaft 43 and the power shaft 23 allow the shafts 23, 43 to rotate at different rotational speeds, thereby allowing the HP compressor 42 and the LP compressor 22 to rotate at different rotational speeds. The HP shaft 43 can be mechanically supported by the power shaft 23 using bearings or the like. In the depicted embodiment, the power shaft 23 is at least partially disposed within the HP shaft 43.

The split compressor arrangement also allows bleed air to be drawn from between the HP compressor 42 and the LP compressor 22. More particularly, in the embodiment of FIG. 1, the engine 10 includes an inter-stage bleed 44 port or valve that is aft of the HP compressor 42 and forward of the LP compressor 22, which may provide for increased flexibility in the available bleed pressures. In a particular embodiment, the bleed pressure design point of the inter-stage bleed 44 is selected based on the pressure ratio of the LP compressor 22, which runs independently from the HP compressor 42. For operability, variable inlet guide vanes (VIGV) 51 and variable guide vanes (VGV) 52 can be used on the LP compressor 22 and at the entry of the HP compressor 42, together with the inter-stage bleed 44.

It should be noted that the engine of FIG. 1 represents only one example engine, and that the embodiments described herein can be applied to any other suitable manner of engine.

In some embodiments, the engine 10 includes one or more variable geometry mechanisms (VGMs) which may assist in achieving optimized engine transient response. In some embodiments, the VGMs consists of one or more VGVs, for instance the VIGV 51 and the VGV 52, which may be one of inlet compressor guide vanes for directing air into the compressor section 12, outlet guide vanes for directing air out of the compressor section 12, variable stator vanes for directing incoming air into rotor blades of the engine 10, and/or one or more variable nozzles, variable bleed-off valves, for instance the inter-stage bleed 44, and the like. It should be understood that one or more of the above-mentioned VGMs may be adjusted for the purpose of decreasing the response time of the engine 10 during rapid engine transitions, e.g. from low to high power levels, or vice-versa. Indeed, adjustment of the position (e.g. the angle) of the VGMs can impact the inlet mass flow to the engine 10, and in turn allow the engine 10 to operate at a required power.

In some embodiments, as illustrated in FIG. 1, the engine 10 has a dual compression system with a low-spool compression system (LPC), including the LP spool 20, and a high-spool compression system (HPC), including the HP spool 40, which are separate from one-another. The VGMs include the VIGV 51 at the air inlet 11 near the LPC and the VGVs 52 upstream of the HPC. It should be noted that other VGMs may also be included for both the LPC and the HPC. In other embodiments, the engine 10 includes only one compression system, and includes fewer or more VGMs.

Figure 2:
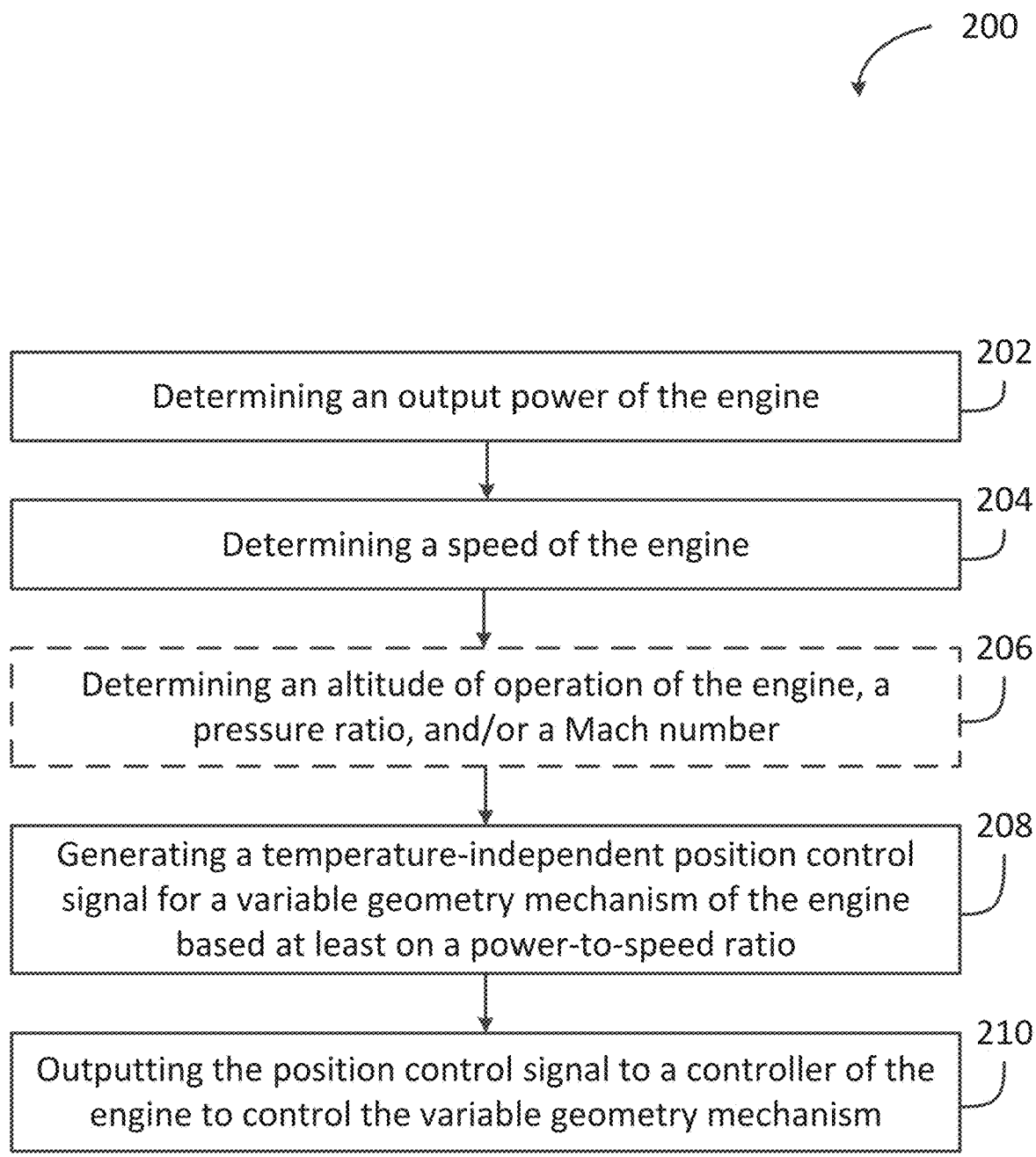
FIG. 2 is a flowchart illustrating an example method for controlling the engine of FIG. 1, in accordance with some embodiments.

With reference to FIG. 2, there is illustrated a method 200 for controlling an engine having a variable geometry mechanism, for example an embodiment of the engine 10 which has a single spool and a VGM, for instance the VIGV 51. It should be noted other examples are also considered, for instance in which the engine 10 has multiple spools which can each have their own VGM, for instance the LP and HP spools 20, 40, with VIGV 51 and VGV 52, respectively, and the method 200 can be used to control any suitable VGM for any suitable spool. In some embodiments, the engine 10 is part of an aircraft. In some embodiments, the method 200 is used to control the embodiments of the engine 10 having a dual compression system. In other embodiments, the method 200 is used to control embodiments of the engine 10 having only a single compression system.

At step 202, an output power of the engine 10 is determined. The output power of the engine 10 can be determined based on one or more sensor measurements, including using one or more speed and torque measurements, as appropriate. Alternatively, or in addition, the output power of the engine 10 can be determined, or estimated, using one or more virtual sensors, which use other sensor measurements to deduce the output power of the engine 10. In some embodiments, the output power is expressed as an absolute power value. In some other embodiments, the output power is expressed as a fraction of a reference power value, for instance a maximum power for the engine 10. Other approaches are also considered.

At step 204, a speed of the engine 10 is determined. The speed of the engine 10 can be determined based on one or more sensor measurements, including rotational speed sensors located on one or more of shafts 23, 24 and 43, as appropriate. Alternatively, or in addition, the speed of the engine 10 can be determined, or estimated, using one or more virtual sensors, which use other sensor measurements to deduce the speed of the engine 10. In some embodiments, the speed is expressed as an absolute speed value. In some other embodiments, the output power is expressed as a faction of a reference speed value, for instance a maximum speed for the engine 10. Other approaches are also considered.

In some embodiments, steps 202 and 204 include obtaining a raw output power value and a raw speed value, respectively, which are then both corrected using a common correction factor. The common correction factor can be used to account for various operating conditions of the engine 10, and can be based on any suitable information and/or measurements. For example, the common correction factor can account for the inlet temperature of the engine or of the compressor(s) stage(s).

In some embodiments, the common correction factor is a temperature ratio—for example, a ratio between a temperature at the inlet of the engine 10 and a predetermined reference temperature can be determined. The temperature at the inlet of the engine can be measured at an inlet of the LP spool 20, measured at an outlet of the LPC compression stage, measured as an ambient temperature in the vicinity of the engine 10, or measured at any other suitable location. Any suitable type of sensor, including a thermocouple sensor, a resistance temperature detector, and the like, can be used. The predetermined reference temperature may be any suitable reference temperature value, for example the International Standard Atmosphere (ISA) temperature at sea level (518.67 Rankine or 288.15 kelvins). The temperature ratio may be determined in any suitable format, including as a percent-change vis-à-vis the predetermined reference temperature, an absolute temperature radio, a relative temperature ratio expressed as a fraction of the predetermined reference temperature, and the like. The temperature ratio may be determined by dividing the first temperature by the predetermined reference temperature, or the converse, or by performing any other suitable calculation. For example, the temperature ratio is determined using the following equation:

$$\theta = \frac{T_1}{T_{ref}} \quad [1]$$

where $\theta$ is the temperature ratio, $T_1$ is the measured temperature at the inlet of the engine 10, and $T_{ref}$ is the predetermined reference temperature. In some embodiments, the square root of the temperature ratio ($\sqrt{\theta}$) is used instead of the temperature ratio itself.

Optionally, at step 206, one or more additional parameters associated with the engine 10 are determined. The additional parameters can then be used to control the position of the VIGV 51. In some embodiments in which the engine 10 is operated in the context of an aircraft, an altitude of operation of the engine 10 is determined. The altitude of operation of the engine 10 can be determined in any suitable fashion. In some other embodiments in which the engine 10 is operated in the context of an aircraft, a Mach number for the aircraft is determined. The Mach number for the aircraft may be determined using any suitable techniques, and in some embodiments an airspeed can be used instead of the Mach number.

In some further embodiments, a pressure ratio—for example, between a pressure in the vicinity of the engine 10 and a predetermined reference pressure—can be determined. The pressure in the vicinity of the engine can be measured at an inlet of the LP spool 20, measured at an outlet of the LPC compression stage, measured as an ambient pressure in the vicinity of the engine 10, or measured at any other suitable location. The predetermined reference pressure may be any suitable reference pressure value, for example one standard atmosphere (1 atm, also expressed as 14.696 psia, 101.325 kPa, etc.). The pressure ratio may be determined in any suitable format, including as a percent-change vis-à-vis the predetermined reference pressure, an absolute pressure radio, a relative pressure ratio expressed as a fraction of the predetermined reference pressure, and the like. The pressure ratio may be determined by dividing the first pressure by the predetermined reference pressure, or the converse, or by performing any other suitable calculation. For example, the pressure ratio is determined using the following equation:

$$\delta = \frac{P_1}{P_{ref}} \quad [2]$$

where δ is the pressure ratio, $P_1$ is the measured pressure in the vicinity of the engine 10, and $P_{ref}$ is the predetermined reference pressure.

Still other parameters associated with the engine 10 (e.g. bleed air extraction, accessory gearbox (AGB) power extraction, etc.) may be determined and used to control the position of the VGMs.

At step 208, a temperature-independent position control signal for the VIGV 51 of the engine 10 is generated based on a power-to-speed ratio. The power-to-speed ratio is obtained by dividing the output power of the engine 10 by the speed of the engine 10. Additionally, the power-to-speed ratio may also be modified using other values, for instance the altitude of operation of the engine 10, the Mach number or airspeed of the associated aircraft, the aforementioned pressure ratio, the aforementioned bleed air extraction, bleed off valve position, AGB power extraction, and the like. For example, the power-to-speed ratio can be divided by the pressure ratio to obtain a modified power-to-speed ratio, which is then used to generate the position control signal.

However, it should be noted that the position control signal generated is independent of any temperature value: this includes any measurement of temperature within the engine 10, any measurement of an ambient temperature in the vicinity of the engine 10, and the like. For instance, in embodiments in which the raw output power and speed for the engine 10 are corrected by a temperature-dependent common correction factor, because the power-to-speed ratio involves a division of the output power by the speed, the contribution of the common correction factor is cancelled out, rendering the position control signal temperature-independent.

The position control signal may be any suitable type of signal, encoded in any suitable format. In some embodiments, the position control signal is generated using one of a plurality of schedules, which may be selected based on an altitude at which the engine 10 is operating and/or the pressure ratio described hereinabove. For example, a schedule for the VIGV 51 is selected based on a determined operating altitude for the engine 10. The schedule includes, for instance, a reference position for the VIGV 51. The reference position can then be modified based on the power-to-speed ratio, which can in turn be adjusted by one or more additional factors, and the modified reference position is used to generate the position control signal.

At step 210, the position control signal is output to the engine 10 and/or to a controller thereof in order to control the VIGV 51. The position control signal may be transmitted using any suitable communication medium. In some embodiments, the position control signal is output to the engine 10, or to the controller thereof, for instance a digital controller, to cause a change in the position of the VIGV 51. In other embodiments, the position control signal is output to the VIGV 51 substantially directly. Other control schemes are also considered. For instance, the VIGV 51 can be controlled by a servo-valve or similar actuator, which can be configured for adjusting the position of the VIGV 51 via an analog input.

For example, the position control signal can be for altering the position of the VIGV 51, or any other suitable VGM of the engine 10. In some embodiments, the method 200 is configured for controlling the operation of VGMs in a single-spool engine. In other embodiments, the method 200 is configured for controlling the operation of VGMs in a dual-spool engine. In such embodiments, an engine controller can implement the method 200 to effect control of VGMs associated with the low-speed spool of the engine, for example the VIGV 51, which is associated with the LP spool 20.

By performing the method 200, control of the operation of VGMs of an engine, for instance the VIGV 51 of the engine 10, can be performed. The use of the power-to-speed ratio as part of the control of the VGMs means that control of the operation of the VGMs of the engine 10 are temperature-independent, and thus not reliant on temperature sensors, which can be slow to respond to rapid changes in temperature. It should be noted that the method 200 can be used to control the geometry of any VGM in the engine 10.

Figure 3:
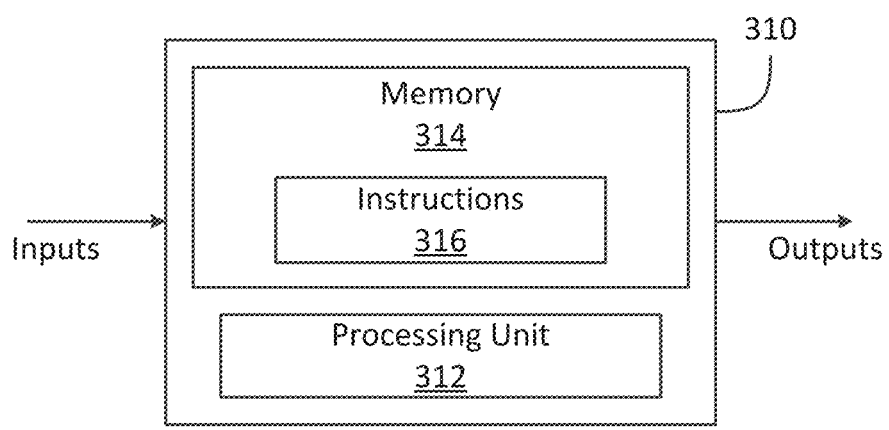
FIG. 3 is a block diagram of an example computer system for implementing the method of FIG. 2, in accordance with some embodiments.

With reference to FIG. 3, the method 200 may be implemented by a computing device 310, comprising a processing unit 312 and a memory 314 which has stored therein computer-executable instructions 316. The processing unit 312 may comprise any suitable devices configured to implement the method 200 such that instructions 316, when executed by the computing device 310 or other programmable apparatus, may cause the functions/acts/steps performed as part of the method 200 as described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

It should be noted that the computing device 310 may be implemented as part of a FADEC or other similar device, including electronic engine control (EEC), engine control unit (EUC), engine electronic control system (EECS), and the like. In addition, it should be noted that the techniques described herein can be performed by a controller of the engine 10 substantially in real-time.

Figure 4:
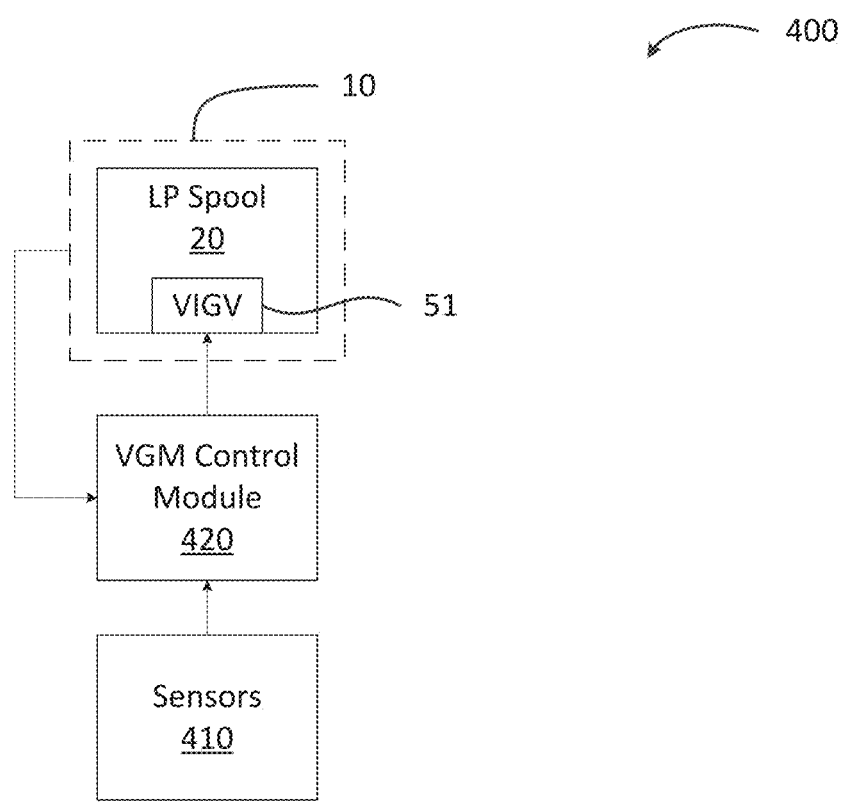
FIG. 4 is a block diagram of an example engine system, in accordance with some embodiments.

With reference to FIG. 4, in some embodiments the engine 10 is part of an engine system 400 of an aircraft. The engine system 400 additionally includes sensors 410 and a VGM control module 420. The engine 10 is communicatively coupled to the VGM control module 420, and the VGM control module 420 is coupled to the sensors 410. Although the embodiment of the engine 10 illustrated in FIG. 4 includes only the LP spool 20 and the VIGV 51, it should be noted that the following discussion can also apply to embodiments of the engine 10 with multiple spools and/or multiple VGMs.

As described hereinabove, in some embodiments the engine 10 includes the HP spool 40 and the LP spool 20. Each of the LP spool 20 and the HP spool 40 has one or more VGMs, for example the VGVs 52 for the HP spool 40 and the VIGVs 51 for the LP spool 20. It should be noted that the engine 10 can include any suitable number of VGMs, including any suitable number of VGVs, variable stator vanes, variable nozzles, variable bleed-off valves, and the like.

The sensors 410 are configured for measuring or otherwise determining values for various characteristics of the engine 10. In some embodiments, the sensors 410 include one or more power sensors, one or more speed sensors, one or more pressure sensors, one or more altitude sensors, one or more temperature sensors, one or more torque sensors, and the like. In some embodiments, the sensors 410 can also include VGM position sensors, which provide feedback regarding the position of the VGMs 51, 52. In some embodiments, the sensors 410 include one or more soft sensors which are configured for estimating or synthesizing one or more values for various characteristics of the engine 10 based on other measurements. The sensors 410 are configured for providing any number of values for the characteristics of the engine 10 to the VGM control module 420.

The VGM control module 420 is configured for implementing at least part of the method 200. The VGM control module 420 is configured for determining an output power of the engine 10, in accordance with step 202. The VGM control module 420 is also configured for determining a speed of the engine 10, in accordance with step 204. Optionally, the VGM control module 420 is configured for determining one or more of an altitude of operation of the engine 10, the Mach number or airspeed of the associated aircraft, a pressure ratio between a pressure in the vicinity of the engine 10 and a reference pressure, and the like, in accordance with step 206.

The VGM control module 420 is also configured for generating a temperature-independent position control signal for the VIGV 51 based at least on a power-to-speed ratio, taken as the ratio of the output power and the speed of the engine 10, in accordance with step 208. The power-to-speed ratio can also be modified based on one or more of the factors determined at step 206. The VGM control module 420 is configured for outputting the position control signal to the engine 10, in accordance with step 214. In some embodiments in which the engine has a single spool compressor system, the VGM control module 420 outputs the position control signal to the VGM associated with the single spool compressor system. Other control techniques may be employed where the engine 10 includes a second spool.

The engine 10 is configured for receiving the position control signal and for effecting a change in the geometry of the VIGV 51 based on the position control signal. It should be noted that the VGM control module 420, and any other suitable elements of the engine system 400, may be implemented as part of a full-authority digital engine controls (FADEC) or other similar device, including electronic engine control (EEC), engine control unit (EUC), various actuators, and the like. In some embodiments, the sensors 410 include sensors for reporting to the VGM control module 420 that the change in the geometry of the VIGV 51 has been effected, or for reporting a current position of the VIGV 51 to the VGM control module 420.

The methods and systems described herein may be implemented in a high level procedural or object oriented programming or scripting language, or a combination thereof, to communicate with or assist in the operation of a computer system, for example the computing device 310. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 312 of the computing device 310, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling an engine having a variable geometry mechanism, comprising:
   determining an output power of the engine;
   determining a speed of the engine;
   generating a temperature-independent position control signal for the variable geometry mechanism based on a power-to-speed ratio, the power-to-speed ratio obtained by dividing the output power by the speed; and
   outputting the position control signal to a controller of the engine to control the variable geometry mechanism.

2. The method of claim 1, further comprising determining an altitude of operation of the engine, wherein generating the position control signal is further based on the altitude of operation.

3. The method of claim 2, wherein generating the position control signal comprises:
   selecting, based on the altitude of operation, a reference position for the variable geometry mechanism;
   adjusting the reference position based on the power-to-speed ratio to obtain a modified position; and
   generating the position control signal based on the modified position.

4. The method of claim 1, further comprising determining a pressure ratio between a first pressure in a vicinity of the engine and a predetermined reference pressure, wherein generating the position control signal is further based on the pressure ratio.

5. The method of claim 4, wherein generating the position control signal comprises:
   dividing the power-to-speed ratio by the pressure ratio to obtain a modified power-to-speed ratio; and
   generating the position control signal based on the modified power-to-speed ratio.

6. The method of claim 4, wherein the first pressure is a pressure at an inlet of the engine.

7. The method of claim 4, wherein the first pressure is an ambient pressure in the vicinity of the engine.

8. The method of claim 1, wherein the engine is an engine of an aircraft, further comprising determining a Mach number for the aircraft, wherein generating the position control signal is further based on the Mach number.

9. The method of claim 1, wherein determining the output power of the engine comprises applying a lead factor or a lag factor to a raw output power value based on a rate of change of the raw output power value.

10. The method of claim 1, wherein determining the output power of the engine comprises adjusting a raw output power value with a common correction factor, and wherein determining the speed of the engine comprises adjusting a raw speed value with the common correction factor.

11. An engine control system for an engine having a variable geometry mechanism, comprising:
   a processing unit; and
   a non-transitory computer-readable memory communicatively coupled to the processing unit and comprising computer-readable program instructions executable by the processing unit for:
     determining an output power of the engine;
     determining a speed of the engine;
     generating a temperature-independent position control signal for the variable geometry mechanism based on a power-to-speed ratio, the power-to-speed ratio obtained by dividing the output power by the speed; and
     outputting the position control signal to a controller of the engine to control the variable geometry mechanism.

12. The system of claim 11, wherein the program instructions are further executable for determining an altitude of operation of the engine, wherein generating the position control signal is further based on the altitude of operation.

13. The system of claim 12, wherein generating the position control signal comprises:
   selecting, based on the altitude of operation, a reference position for the variable geometry mechanism;
   adjusting the reference position based on the power-to-speed ratio to obtain a modified position; and
   generating the position control signal based on the modified position.

14. The system of claim 11, wherein the program instructions are further executable for determining a pressure ratio between a first pressure in a vicinity of the engine and a predetermined reference pressure, wherein generating the position control signal is further based on the pressure ratio.

15. The system of claim 14, wherein generating the position control signal comprises:
   dividing the power-to-speed ratio by the pressure ratio to obtain a modified power-to-speed ratio; and
   generating the position control signal based on the modified power-to-speed ratio.

16. The system of claim 14, wherein the first pressure is a pressure at an inlet of the engine.

17. The system of claim 14, wherein the first pressure is an ambient pressure in the vicinity of the engine.

18. The system of claim 11, wherein the engine is an engine of an aircraft, and wherein the program instructions are further executable for determining a Mach number for the aircraft, wherein generating the position control signal is further based on the Mach number.

19. The system of claim 11, wherein determining the output power of the engine comprises applying a lead factor or a lag factor to a raw output power value based on a rate of change of the raw output power value.

20. The system of claim 11, wherein determining the output power of the engine comprises adjusting a raw output power value with a common correction factor, and wherein determining the speed of the engine comprises adjusting a raw speed value with the common correction factor.

* * * * *